US010805139B2

United States Patent
Chen et al.

(10) Patent No.: US 10,805,139 B2
(45) Date of Patent: Oct. 13, 2020

(54) SOFTWARE-DEFINED RADIO SYSTEM AND METHOD FOR DETECTING PACKETS

(71) Applicant: INDUSTRIAL TECHNOLOGY RESEARCH INSTITUTE, Hsinchu (TW)

(72) Inventors: Chih-Ying Chen, Hsinchu (TW); Ren-Jr Chen, Hsinchu (TW); Zan-Yu Chen, Hsinchu (TW); Chung-Lien Ho, Hsinchu (TW); Wen-Chiang Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/233,182

(22) Filed: Dec. 27, 2018

(65) Prior Publication Data

US 2020/0014575 A1 Jan. 9, 2020

Related U.S. Application Data

(60) Provisional application No. 62/694,498, filed on Jul. 6, 2018.

(30) Foreign Application Priority Data

Nov. 19, 2018 (TW) .............................. 107141011 A (51) Int. Cl.
*H04L 27/26* (2006.01)
*H04B 1/00* (2006.01)

(52) U.S. Cl.
CPC ....... *H04L 27/2666* (2013.01); *H04B 1/0003* (2013.01); *H04L 27/2605* (2013.01)

(58) Field of Classification Search
CPC ............ H04L 27/2666; H04L 27/2605; H04B 1/0003
See application file for complete search history.

(56) References Cited

U.S. PATENT DOCUMENTS

| 5,768,305 A | 6/1998 | Kanda |
| 5,872,772 A * | 2/1999 | Mizuno ................. H04L 12/462 |
| | | 370/254 |

(Continued)

FOREIGN PATENT DOCUMENTS

CN    105430688    3/2016

OTHER PUBLICATIONS

Giugno, et al. "Carrier Frequency and Frequency Rate-of-Change Estimators with Preamble-Postamble Pilot Symbol Distribution", Communications, 2005, IEEE International Conference on May 16, 2005, pp. 2478-2482.
Chen, et al. "Work in Progress: A New Preamble Design and Pattern Matching Aided Timing Synchronization for PLC", Communications and Networking in China (CHINACOM), 2014 9th IEEE International Conference on Aug. 14, 2014, pp. 44-47.

(Continued)

*Primary Examiner* — Jaison Joseph
(74) *Attorney, Agent, or Firm* — Amin, Turocy & Watson, LLP (57) ABSTRACT

A software-defined radio system for detecting packets is disclosed, including: a transmitting end configured for assigning a preamble and a postamble to a start position and an end position of a packet of a signal, respectively, before transmitting the signal; and a receiving end configured for detecting if a packet exists in the air or in a channel based on the preamble and the postamble, wherein the receiving end stores the signal in memory when detecting the preamble, and stops storing the signal in the memory and transmits the signal to a computing device when detecting the postamble. A packet detection method for a software-defined radio system is also provided.

6 Claims, 12 Drawing Sheets

(56) References Cited

U.S. PATENT DOCUMENTS

| | | | |
|---|---|---|---|
| 6,615,345 B1 | 9/2003 | LaBerge | |
| 7,155,263 B1 * | 12/2006 | Bergamo | H04W 52/0229 |
| | | | 455/574 |
| 7,911,857 B1 | 3/2011 | Venkataraman et al. | |
| 8,023,342 B2 | 9/2011 | Venkataraman et al. | |
| 8,762,817 B1 | 6/2014 | Chaichanavong et al. | |
| 8,947,811 B1 | 2/2015 | McFadyen | |
| 2004/0203472 A1 * | 10/2004 | Chien | H04B 1/30 |
| | | | 455/68 |
| 2008/0144753 A1 | 6/2008 | Saed et al. | |
| 2009/0086832 A1 | 4/2009 | Tarokh et al. | |
| 2011/0128793 A1 | 6/2011 | Venkataraman et al. | |
| 2012/0170384 A1 * | 7/2012 | Oh | G11C 7/1084 |
| | | | 365/189.05 |
| 2016/0157127 A1 | 6/2016 | Zeger et al. | |
| 2018/0262366 A1 * | 9/2018 | Sahin | H04B 7/0452 |

OTHER PUBLICATIONS

Singya, et al. "A Data-Aided Timing Offset Estimator for OFDM Synchronization", Signal Processing, Informatics, Communication and Energy Systems (SPICES), 2015 IEEE International Conference on Feb. 19, 2015, pp. 1-5.

Awoseyila, et al. "Improved Preamble-Aided Timing Estimation for OFDM Systems", IEEE Communications Letters Dec. 16, 2008, pp. 825-827.

Ying, et al. "Optimal Pilot Placement for Frequency Offset Estimation and Data Detection in Burst Transmission Systems", IEEE Communication Letters, Aug. 29, 2005, pp. 549-551.

Sreedhar, et al. "An efficient preamble design for timing synchronization in MIMO-OFDM systems", Control, Instrumentation, Communication and Computational Technologies (ICCICCT), 2015 IEEE International Conference on Dec. 18, 2015, pp. 84-88.

Taiwanese Office Action for Taiwanese Patent Application No. 107141011 dated Jul. 29, 2019.

\* cited by examiner

SOFTWARE-DEFINED RADIO SYSTEM AND METHOD FOR DETECTING PACKETS

CROSS-REFERENCE TO RELATED APPLICATIONS

This application claims the benefit of U.S. Provisional Application No. 62/694,498, filed on Jul. 6, 2018 and Taiwan Application No. 107141011, filed on Nov. 19, 2018, which are hereby incorporated by reference as if fully set forth herein.

BACKGROUND

1. Technical Field

This disclosure relates to software-defined radios, and, more particularly, to a software-defined radio system and a method for detecting a preamble and a postamble of a packet.

2. Description of Related Art

Nowadays, a software-defined radio (SDR) platform is very popular in the market. The SDR platform can be connected to a computer directly. The parameters of the SDR platform can be performed through a software interface. In a transmission mode, a signal format to be transmitted can be quickly defined by the software or program; and in a receiving mode, the operating and processing processes for received signals can be defined in the software directly. The hardware part of the SDR platform includes a front module (including filters, modulator/demodulator, RF modules, etc.) and a computer communication interface, so that a user does not need to design or realize the front module, and can construct a communication system quickly, while maintaining design flexibility and retaining the programmable parameter settings of the front module for the user to customize the definition on the software end.

Therefore, the SDR platform is extremely suitable for applications such as fundamental frequency algorithm development, channel measurement, and rapid establishment of communication systems, etc., and provides a low-cost and easy-to-use option.

However, the original advantages of a general SDR are still preserved when an SDR platform is developed, and a user can develop a process control research, such as network communication protocols, various handshaking mechanisms in a communication system, automatic re-sending mechanism, etc. In the applications relating these process controls, the SRD must not only have the ability to receive signals, but must also be able to detect and receive a complete packet and correctly know the start and end positions of each packet. The platform must also have the duplex capability. Therefore, the design detection mechanism for the start and end positions of a packet are very important.

SUMMARY

A software-defined radio system for packet detection and a packet detection method for a software-defined radio system are disclosed.

In an embodiment, the software-defined radio system includes: a transmitting end configured for assigning a preamble and a postamble to a start position and an end position of a packet of a signal, respectively, before transmitting the signal; and a receiving end configured for detecting a channel, wherein the receiving end stores the signal in memory when the preamble is detected, and stops storing the signal in the memory and transmits the signal to a computing device when the postamble is detected.

In an embodiment, the preamble and the postamble have a fixed number of points, and are not related to a transmission baud-rate or a sampling rate defined by the software-defined radio system. A maximal bandwidth allocated with the preamble and the postamble is defined as Bmax, a bandwidth that is actually occupied by the preamble and the postamble is defined as B, and the designed preamble and postamble in an embodiment are a constant B/Bmax. An embodiment that is realized can be referred to FIG. 2. The preamble and postamble are both fixed to N points. By using a modulation method of OFDM, a sequence of M points is designed to be placed on sub-carriers representing different frequencies, and then the IFFT of N points is performed to generate the preamble and the postamble having N points. The same M and N are used for the transmission baud-rate, sampling rate, carrier frequency, transmission attenuation and reception gain set by the software-defined radio system. In a detection circuit of the receiving end, under different sampling rate settings, the preamble and the postamble can be downsampled by the same magnification, and the detection circuit re-detects whether the downsampled synchronization signal exists in the received signal. Therefore, the same detection circuit can be used to detect the preamble and the postamble at different sampling rate settings.

In another embodiment, the preamble and the postamble have a fixed number of points, and are not related to a transmission baud-rate or a sampling rate defined by the software-defined radio system. A maximal bandwidth allocated with the preamble and the postamble is defined as Bmax, a bandwidth that is actually occupied by the preamble and the postamble is defined as B, the designed preamble and postamble in a preferred embodiment are not constant B/Bmax, and r is reduced as the transmission baud-rate or sampling rate set by the software-defined ratio system increases, and vice versa. An embodiment that is realized can be referred to FIG. 5. The preamble and postamble are both fixed to N points. By using a modulation method of OFDM, a sequence of M points is designed to be placed on sub-carriers that represent different frequencies, and then the IFFT of N points is performed to generate the preamble and the postamble having N points. M is increased as the transmission baud-rate or the sampling rate set by the software-defined radio system increases. In the detection circuit of the receiving end, after the preamble and the postamble are downsampled, it is detected whether the downsampled synchronization signal exists in the received signal. The downsample rate supported at different sampling rate settings are different.

In yet another embodiment, in the transmitting end, the preamble and the postamble can be constituted by a plurality of symbols having a length of N points connected in series; a plurality of sequences on the plurality of symbols are the same or different, and are selected by using group IDs. In the receiving end, the receiving end first detects a first symbol in the plurality of symbols having the length of N points; when detecting successfully, the receiving end continues to detect a second symbol in the plurality of symbols; when detecting successfully, it is determined whether a time difference between the second symbol and the first symbol is correct; and if correct, the next symbol in the plurality of symbols is continuously detected until all the plurality of symbols are detected successfully, indicating that the preamble or the postamble is detected successfully.

In an embodiment, the packet detection method for a software-defined radio system, the method includes: assigning a preamble and a postamble to a start position and an end position of a packet of a signal, respectively, before transmitting the signal by a transmitting end; detecting a channel by a receiving end; storing the signal in memory by the receiving end when the preamble is detected; and stopping storing the signal in the memory and transmitting the signal to a computing device by the receiving end when the postamble is detected.

In addition, the packet detection method of the present disclosure further includes an augmentation method for simultaneously operating and supporting a maximum number of groups. The augmentation method includes: in the transmitting end, the preamble and the postamble are composed of a plurality of symbols having a length of N points connected in series; a plurality of sequences on the plurality of symbols are the same or different, and are selected by using group IDs; and in the receiving end, the receiving end first detects a first symbol in the plurality of symbols having the length of N points; when detecting successfully, the receiving end continues to detect a second symbol in the plurality of symbols; when detecting successfully, it is determined whether a time different between the second symbol and the first symbol is correct; and if correct, the next symbol in the plurality of symbols is continuously detected until all the plurality of symbols are detected successfully, indicating that the preamble or the postamble is detected successfully.

BRIEF DESCRIPTION OF DRAWINGS

The disclosure can be more fully understood by reading the following detailed description of the embodiments, with reference made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A software-defined radio (SDR) system for packet detection is disclosed in the present disclosure, so that the software-defined radio can ensure complete packet data reception when receiving.

Figure 1:
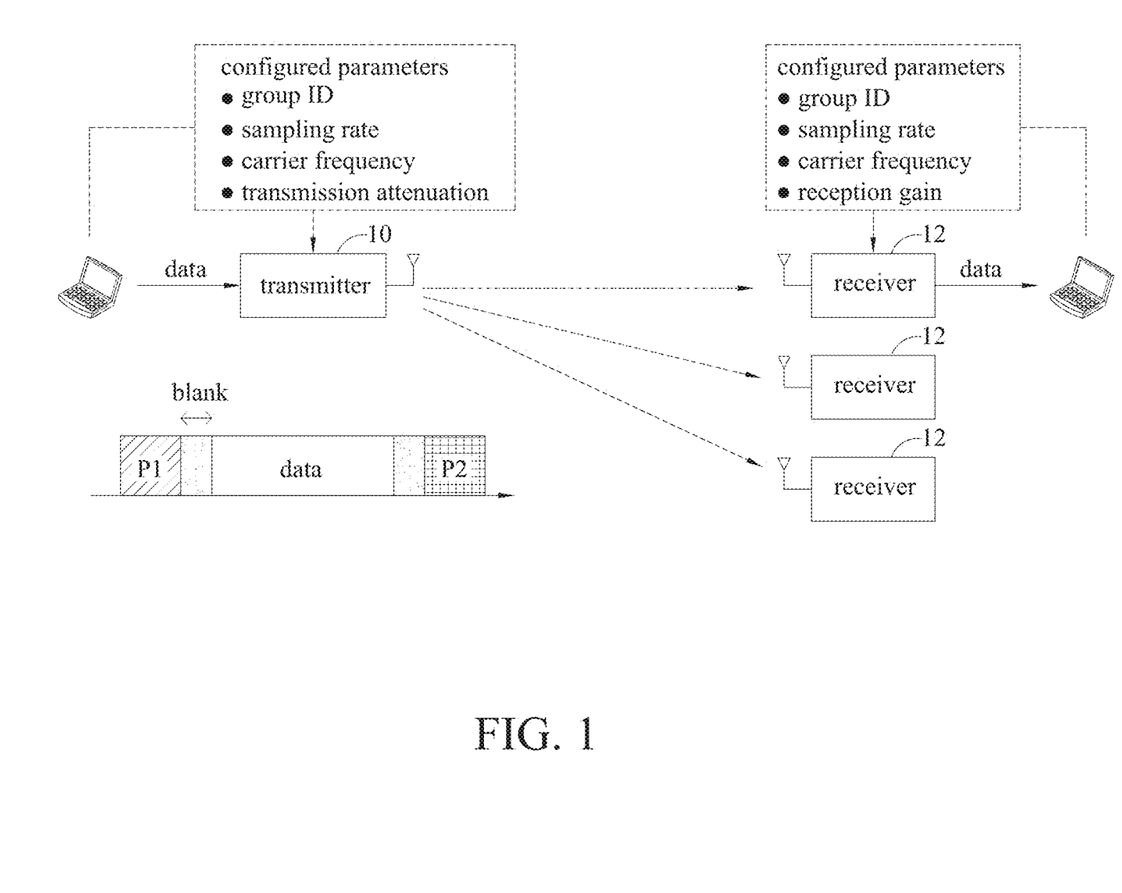
FIG. 1 is a schematic diagram of a software-defined radio system for packet detection according to the present disclosure.

FIG. 1 shows the formats of the start and end of a packet according to the present disclosure. In a transmitting end 10, a user-defined transmission signal (labeled as data in FIG. 1) will first transmit a sequence of numbers, which is called P1, followed by a small blank, which enables the P1 not to interfere with user signals in the receiving end due to the channel multipath effect, and the complete user signal can still be received under the influence of the channel effect and the transmission clock error in the receiving end 12. After the user signal is transmitted completely, it is also followed by a short blank, and finally a sequence of numbers, which is called P2. The receiving end 12 uses the P1 and P2 to know the start and end of the user signal, in order to store the complete user signal for the user to process on a software side. In addition, each software-defined radio platform provides users with parameters such as group ID, sampling rate, carrier frequency, transmission attenuation and reception gain set independently, and supports a one-to-many platform transmission, and also provides multiple set of transceivers in communication to operate simultaneously.

As shown in FIG. 1, the software-defined radio system for packet detection provided by the present disclosure includes a transmitting end 10 that assigns a preamble P1 and a postamble P2 to a start position and an end position of a packet of a signal, respectively, before transmitting the signal; and a receiving end 12 that detects if a packet exists in the air or in a channel based on a preamble and a postamble by detecting a channel, wherein the receiving end 12, when the preamble P1 is detected, stores the signal in memory, and, when the postamble P2 is detected, stops storing the signal in the memory and transmits the signal to a computing device.

The software-defined radio system for packet detection provided by the present disclosure includes two design structures for synchronous signals, which are respectively described in detail as follows.

The First Embodiment

Figure 2:
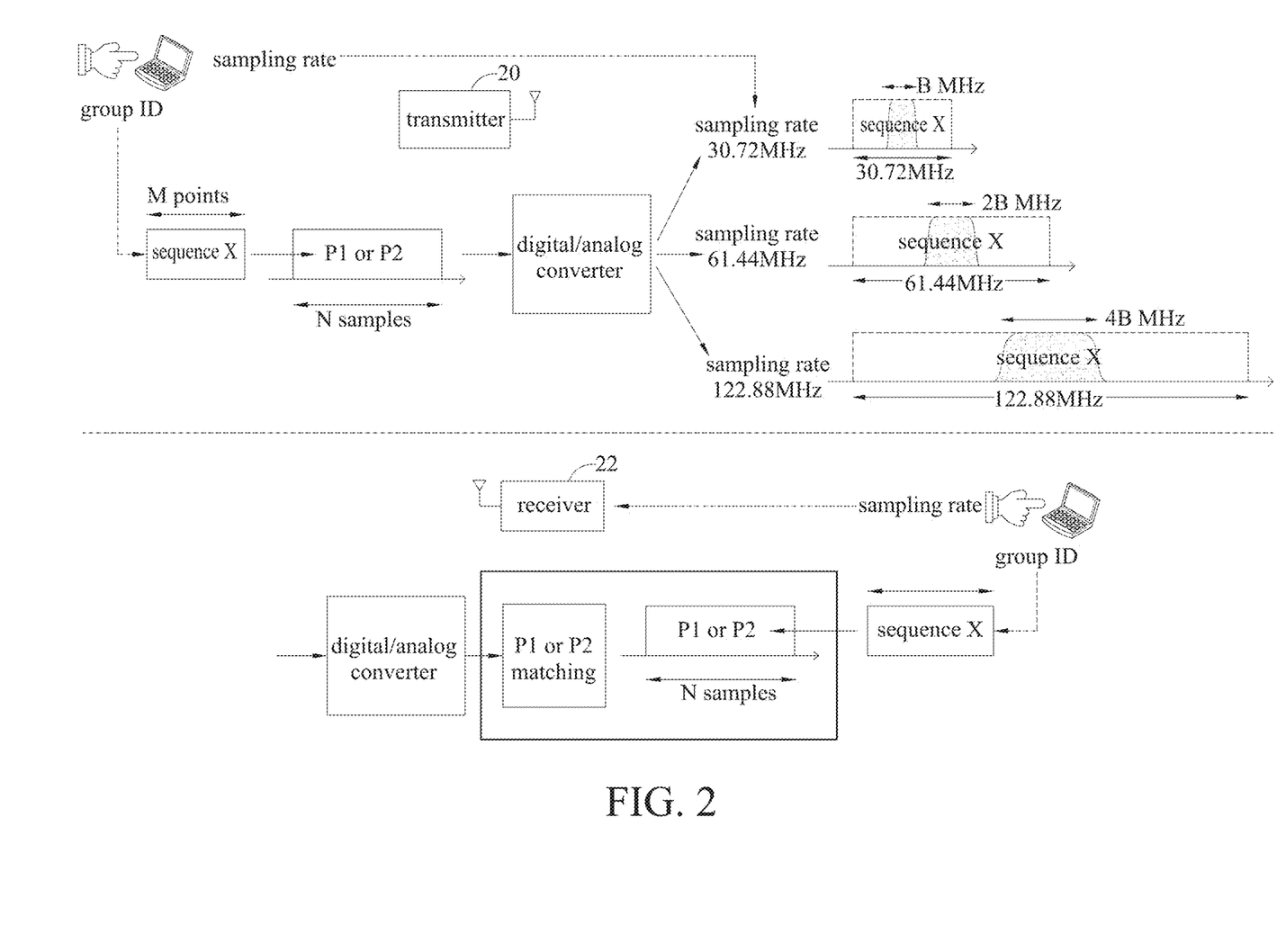
FIG. 2 is a schematic diagram of a software-defined radio system for packet detection according to a first embodiment of the present disclosure.

As shown in FIG. 2, the preamble and the postamble are symbols of N points, which are composed of a sequence of M points in frequency (the minimum frequency sub-carrier is located at the center). The same M and N are used for the parameter settings, such as the sampling rate, carrier frequency, transmission attenuation and reception gain, etc. The content of the sequence of M points is only related to the group ID. The way in which the preamble avoids interference among different groups can be divided into the following two scenarios:

(1) Among the groups with the same sampling rate, the preambles are distinguished by different sequences. That is to say, the transmitting end 20 of the group ID a corresponds to a sequence x to compose its preamble; and if the group ID is also set to a, the receiving end 22 corresponding to the sequence x is used for detection and can detect successfully; otherwise, if the group ID is set to be b, the receiving end 22 that is composed of a sequence y cannot detect successfully.

Therefore, the preamble having the group ID a does not cause a false alarm to the group ID b.

(2) The characteristics of the preamble among the groups with different sampling rates will not affect one another; that is, if the transmitting end 20 has the sampling rate set to f0 and the group ID is set to a, the receiving end 22 that uses the group ID composed of the sequence x will not detect successfully, even if the receiving end 22 has the group ID that is set to a.

Such design makes it possible to set different group IDs among groups that set the same sampling rate in all the groups that operate simultaneously to avoid mutual interference of signals. There is no false alarm among groups that are set to have different sampling rates, so the total number of groups that can operate simultaneously can be greatly improved. In addition, at any sampling rate setting, the receiving end 22 can support the preamble after N/M times of downsampling, and then perform matching detection. Therefore, the same matching circuit can be used under different parameter settings. Different sampling rates use a sequence of M points, and share the same sequence set. Accordingly, the complexity of the matching circuit is reduced, and the memory requirement is reduced.

Figure 3A:
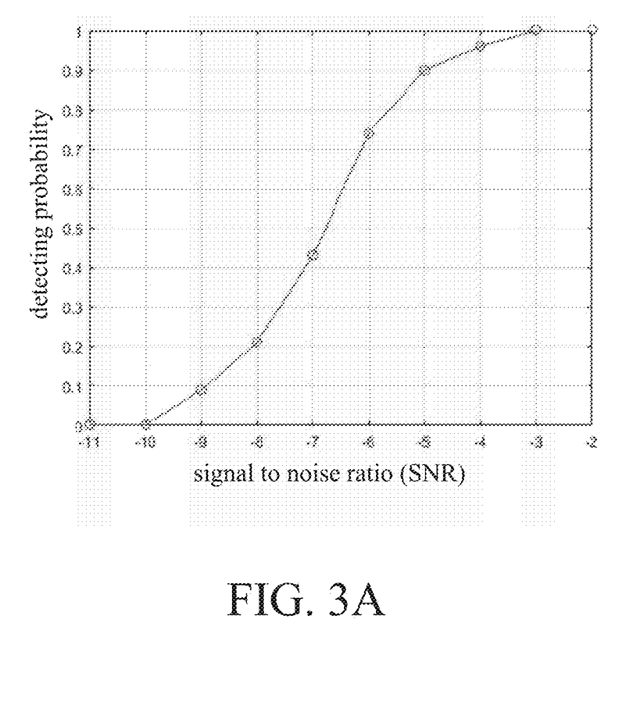
FIGS. 3A, 3B and 3C are diagrams showing the performance test results of the first embodiment of the present disclosure.
Figure 3B:
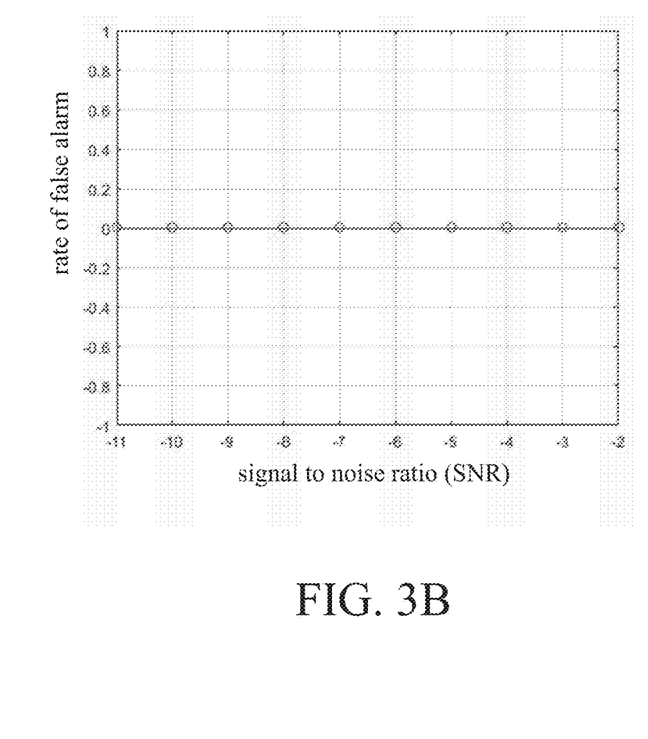
Figure 3C:
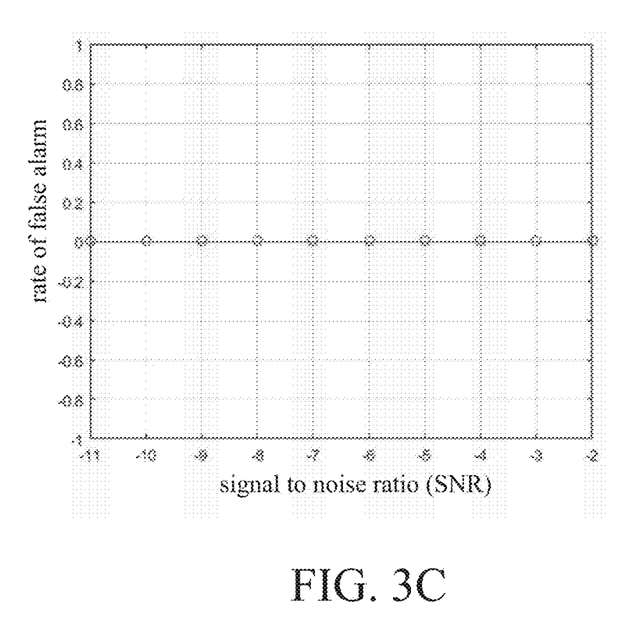
Figure 4:
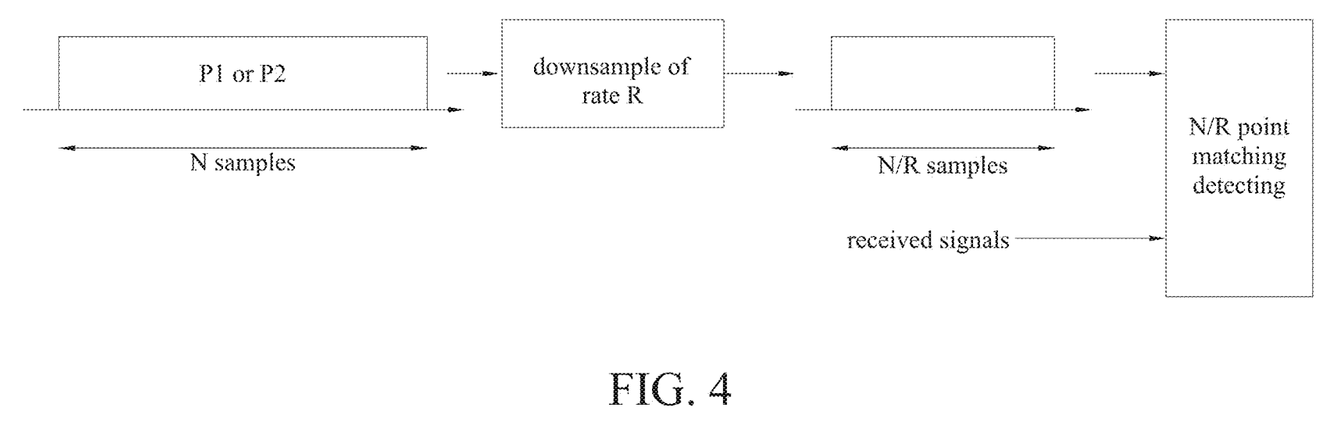
FIG. 4 is a block diagram showing a detection circuit of a receiving end according to the present disclosure.

Taking a practical application scenario as an example, if the software-defined radio platform provides three sampling rates for a user to set: 30.72 MHz, 61.44 MHz and 122.88 MHz; the three sampling rates may have up to 64, 50 and 32 groups that operate simultaneously, respectively; and at the same time, the clock that matches the hardware is expected to operate at as high as 30.72 MHz if the cost of the hardware is taken into consideration. In the manner of the first embodiment, when the Zadoff-Chu sequence is selected, at least a Zadoff-Chu sequence of length 64 is required. A total of 64 sequences can be provided by using different root indexes, that is, corresponding group IDs 0-63 can be set; and since a sampling rate of up to 122.88 MHz can be supported, and the matching hardware has a maximum operating clock of up to 30.72 MHz, the sub-sampling rate of the matching hardware is 122.88/30.72=4, which allows the symbol of the preamble to have a length of at least 64×4=256. Therefore, M in FIG. 2 is 64, and N is 256. The performance test of the first embodiment is shown in FIGS. 3A, 3B and 3C. FIG. 3A shows the probability of correctly detecting the preamble in the same group when a receiving end employs the matching detection of 4 times sampling rate. FIG. 3B shows the probability of two groups with the same sampling rate (the two groups are set to have different group IDs and correspond to the Zadoff-Chu sequences of different root indexes), wherein the transmitting end causes a fault alarm of the receiving end of another group. FIG. 3C shows the probability of two groups with the sampling rate (the two groups are set to have different group IDs and correspond to the Zadoff-Chu sequences of same root indexes), wherein the transmitting end causes a fault alarm of the receiving end of another group. Specifically, as shown in FIG. 3A, it can be seen that under various sampling rate settings, the preamble having a signal-to-noise ratio (SNR) greater than −3 dB can be detected correctly, and is suitable for various communication related applications, for example, synchronization mechanism, frequency offset, data encoding and decoding, etc. FIG. 3B is a diagram showing that using different Zadoff-Chu sequences can completely avoid the influence of the preamble of other groups, and no fault alarm occurs even if the SNR is as low as −11 dB. FIG. 3C shows the groups with different sampling rates, and shows that even if the same Zadoff-Chu sequence is used, it will not affect each other. It is worth noting that the detection circuit of the receiving end of the first embodiment of the present disclosure can be realized by reference to FIG. 4. A preamble of N points passes through a downsampling circuit with a downsample rate R, and after the downsampled synchronization signals of N/R points are obtained, the matching detection of the N/R points is used to detect whether the synchronization signals of the N/R points exist in the received signals. For the first embodiment, N is 256, and the three sampling rate settings: 30.72 MHz, 61.44 MHz and 122.88 MHz can be used to design the detection circuit by using R=4. Therefore, all the sampling rate settings can be used for the same detecting circuit.

The Second Embodiment

Figure 5:
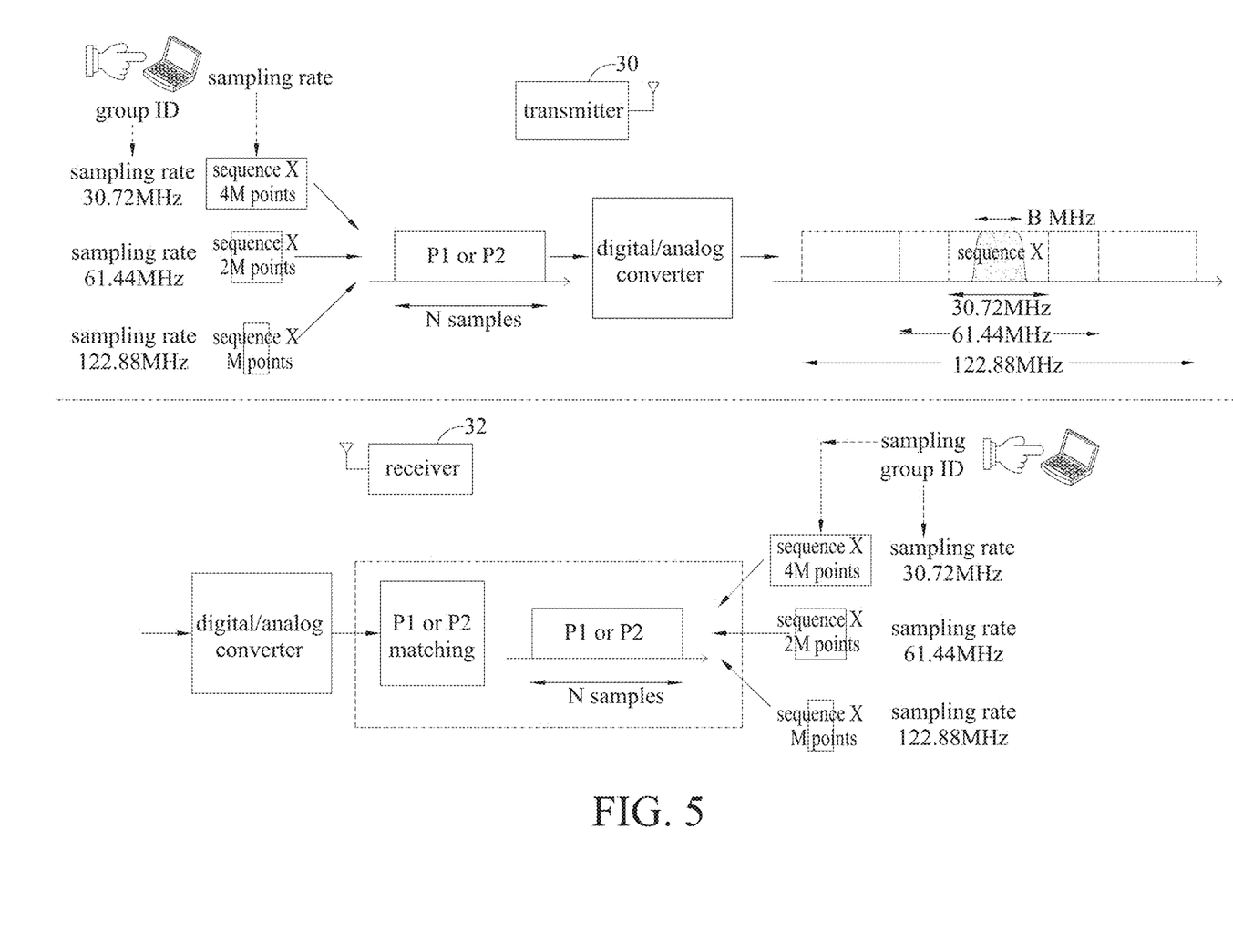
FIG. 5 is a block diagram showing the software-defined radio system for packet detection according to a second embodiment of the present disclosure.

As shown in FIG. 5, the second embodiment of the present disclosure includes a transmitting end 30 and a receiving end 32. Regardless of the parameter setting, both the preamble and the postamble are symbols of N points, and the preamble is composed of a sequence constituting the preamble that covers a fixed bandwidth. The second embodiment will cause the number of sequence points placed on the frequency to vary depending on the sampling rate settings. As shown in FIG. 5, if the length of the sequence at the sampling rate of 61.44 MHz is M, the lengths of the sequences configured on the frequency are changed to 2 M and M/2, respectively, when the sampling rates are set to 30.72 MHz and 122.88 MHz. The way in which the preamble avoids interference among different groups can be divided into the following two scenarios:

(1) Among the groups with the same sampling rate, the preambles are distinguished by different sequences.

(2) Among the groups with different sampling rates, the characteristics of the preamble will not affect one another, and different sequences are not needed to distinguish them.

Such design is the same as the first embodiment, and no additional sequence is needed to avoid interference among the groups with different sampling rates. Therefore, the total number of simultaneously operating groups can be greatly improved. At a higher sampling rate setting, a higher downsample rate than the first embodiment can be provided for downsampled matching. Accordingly, the cost of hardware is further reduced, or a higher sampling rate setting can be supported in the future. At a lower sampling rate setting, the ratio of the sequence to the total bandwidth is larger, and the matching result at the receiving end 32 can reduce the matching noise, and the receiving end 32 is suitable for operating in a lower SNR environment. Since the matching circuit for a lower sampling rate setting has a lower complexity than that of the match circuit for a higher sampling rate setting, the matching circuit for a lower sampling rate setting doesn't need to sacrifice the detection performance for achieving a low complexity.

Figure 6A:
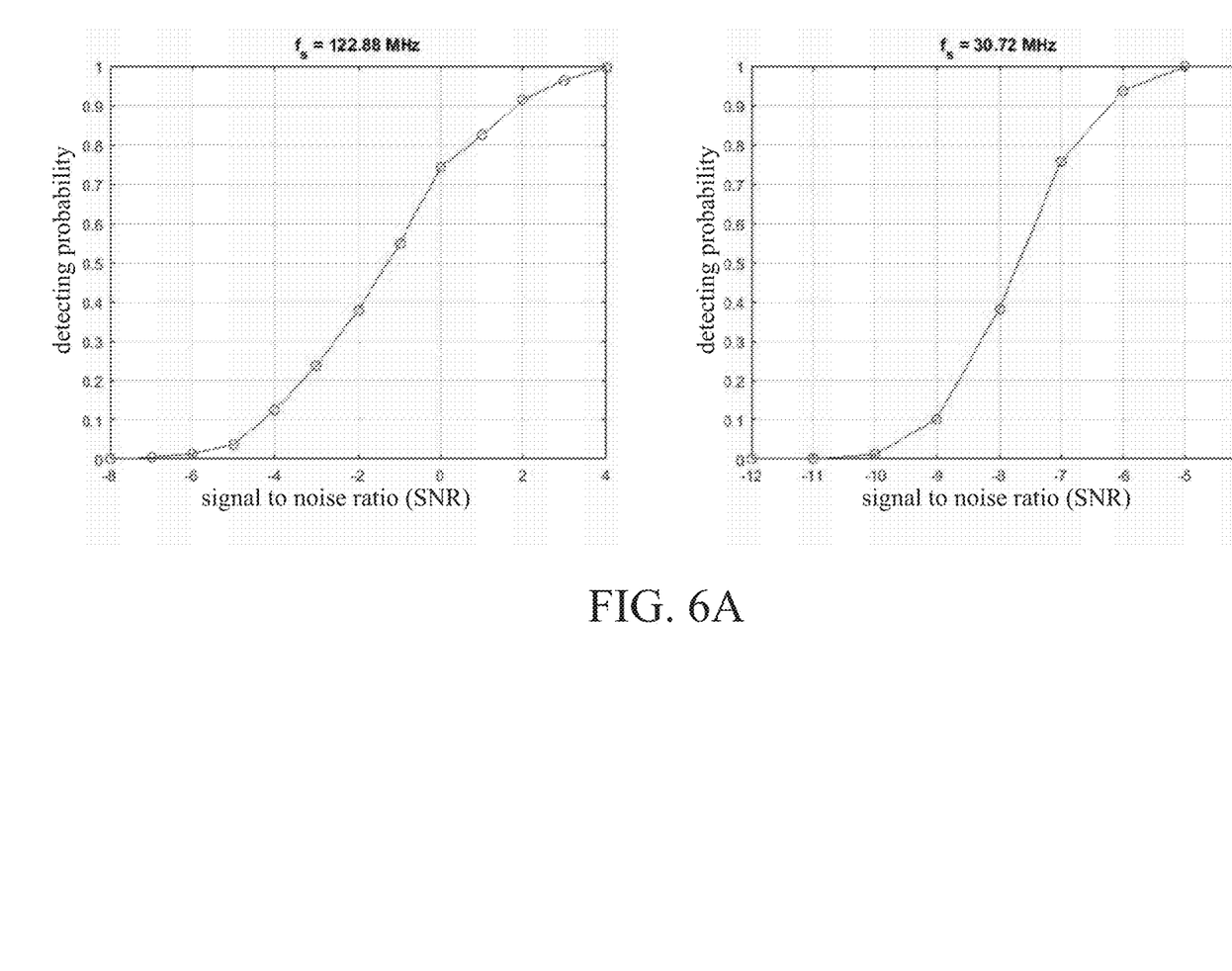
FIGS. 6A, 6B and 6C are diagrams showing the performance test results of the second embodiment of the present disclosure.
Figure 6B:
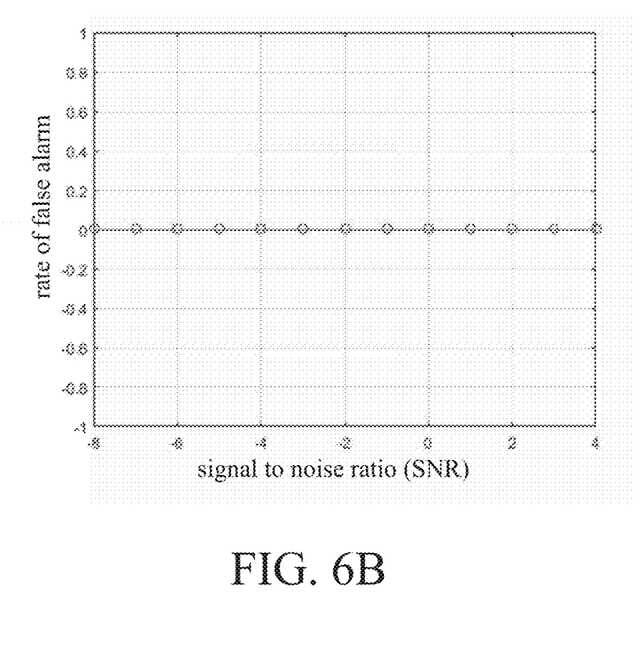
Figure 6C:
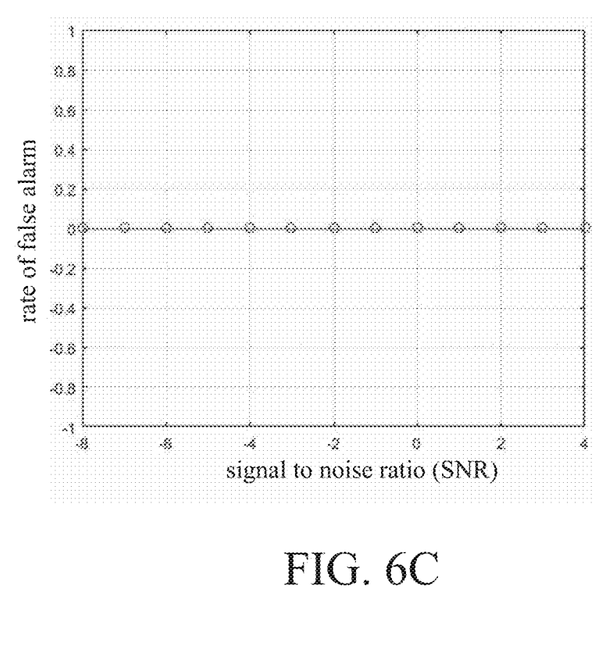

Taking a practical application scenario as an example, if the software-defined radio platform provides three sampling rates for a user to set: 30.72 MHz, 61.44 MHz and 122.88 MHz; the three sampling rates may have as up to 64, 50 and 32 groups that operate simultaneously, respectively; and at the same time, the clock that matches the hardware is expected to operate at as high as 15.36 MHz if the cost of the hardware is taken into consideration. In the manner of the second embodiment, when the Zadoff-Chu sequence is selected, the Zadoff-Chu sequences of lengths 128, 64 and 32 are required for the three sampling rate settings, respectively, and 128, 64 and 32 groups can be supported to operate simultaneously. Since a sampling rate of up to 122.88 MHz is supported, and the matching hardware has a maximum operating clock of 15.36 MHz, the downsample rate of the matching hardware is 122.88/15.36=8, which allows the symbol of the preamble to have a length of at least 32×8=256. Therefore, M in FIG. 5 is 64, and N is 256. The performance test of the second embodiment is shown in FIGS. 6A, 6B and 6C. FIG. 6A shows the probability of correctly detecting the preamble in the same group, wherein the performances of the groups have the sampling rates of 122.88 MHz and 30.72 MHz, respectively, when the receiving end performs matching detection of the sampling rate 15.36 MHz. FIG. 6B shows the probability of two groups with the same sampling rate of 122.88 MHz (the two groups are set to have different group IDs and correspond to the Zadoff-Chu sequences of different root indexes), wherein the transmitting end causes a fault alarm of the receiving end of another group. FIG. 6C shows the probability of two groups with different sampling rates of 122.88 MHz and 30.72 MHz, respectively (the two groups are set to have different group IDs and correspond to the Zadoff-Chu sequences of different root indexes; the Zadoff-Chu sequence lengths used by the two groups are different due to different sampling rates), wherein the transmitting end causes a fault alarm of the receiving end of another group. Specifically, as shown in FIG. 6A, it can be seen that the lower the sampling rate is, the higher the ratio of the sequence to the total bandwidth is and the lower the matching noise becomes. Therefore, the sampling rate of 30.72 MHz can support a lower SNR environment than the sampling rate of 122.88 MHz does. However, the sampling rate of 122.88 MHz can support matching detection with the downsample rate up to 8. The actual test result shows that the range of the SNR that can be correctly detected can also be applied to the most communication-related applications. FIG. 6B shows that using different Zadoff-Chu sequences can completely avoid the effects of the preambles of other groups, while FIG. 3C verifies the groups with different sampling rates, and shows that even if the Zadoff-Chu sequences that use the same root index are used and the sequence bandwidths are the same, it will not affect each other. It is worth noting that the detection circuit of the receiving end of the second embodiment of the present disclosure can be realized by reference to FIG. 4. A preamble of N points passes through a downsampling circuit of rate R, and after the downsampled synchronization signals of N/R points are obtained, the matching detection of the N/R points is used to detect whether the synchronization signals of the N/R points exist in the received signals. For the second embodiment, N is 256, and the three sampling rate settings: 30.72 MHz, 61.44 MHz and 122.88 MHz, can be used to design the detection circuit by using R=2, 4 and 8, respectively. When the sampling rate is set to 30.72 MHz, R is smaller for better detection performance. When the sampling rate is set to 122.88 MHz, R=8 and the operating clock of the detection circuit can be reduced to 122.88/8=15.36 MHz rather than operating at 122.88 MHz. It greatly reduces the computational complexity of the detection circuit.

The Third Embodiment

Figure 7:
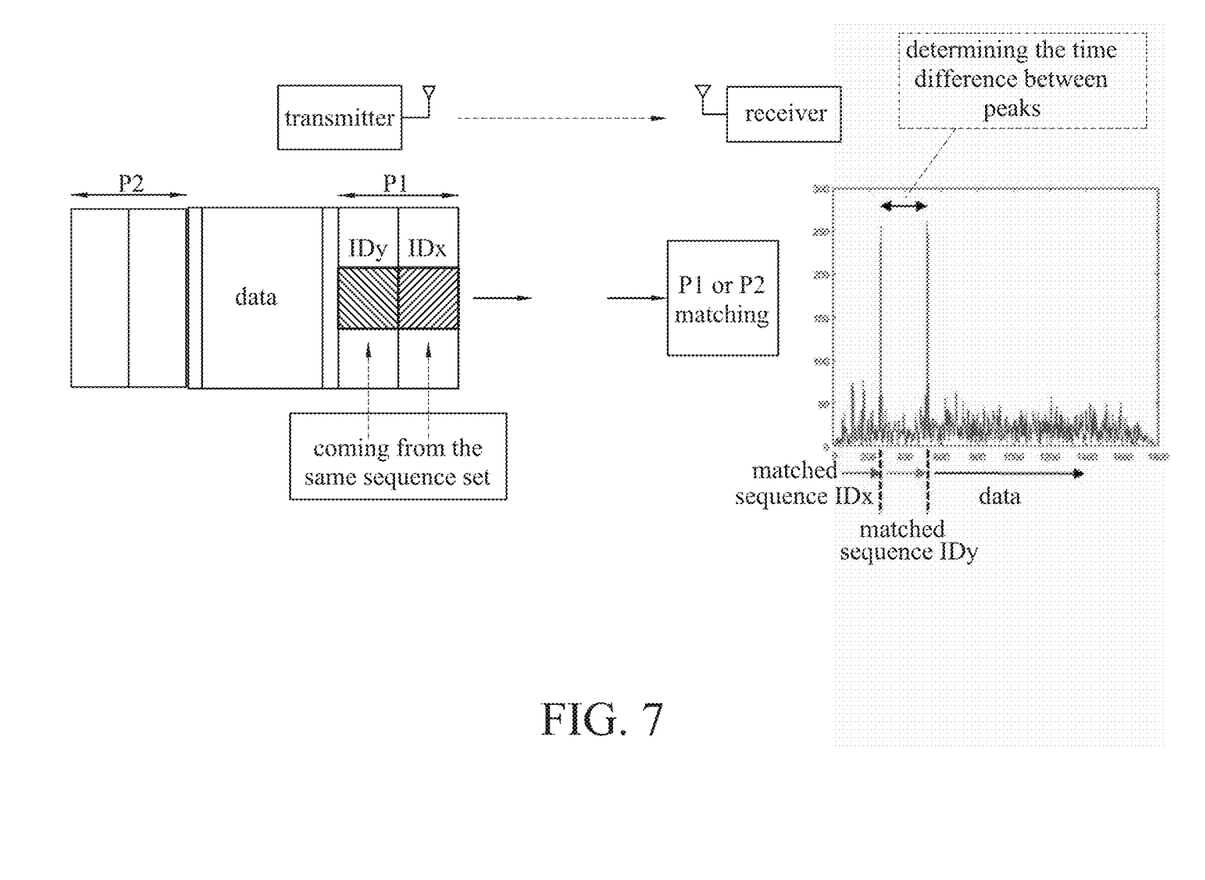
FIG. 7 is a schematic diagram showing an augmentation method for simultaneously operating and supporting a maximum number of groups according to a third embodiment of the present disclosure.
Figure 8A:
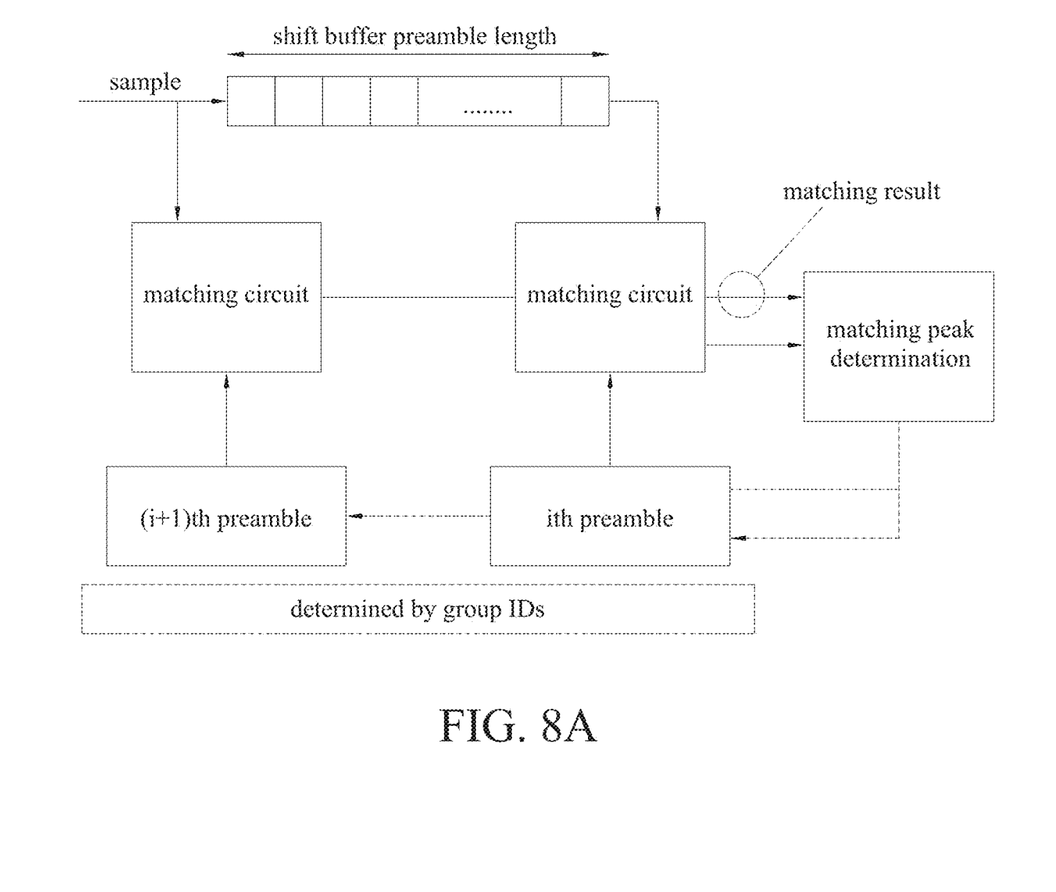
FIG. 8A is a block diagram showing the augmentation method of the third embodiment of the present disclosure.
Figure 8B:
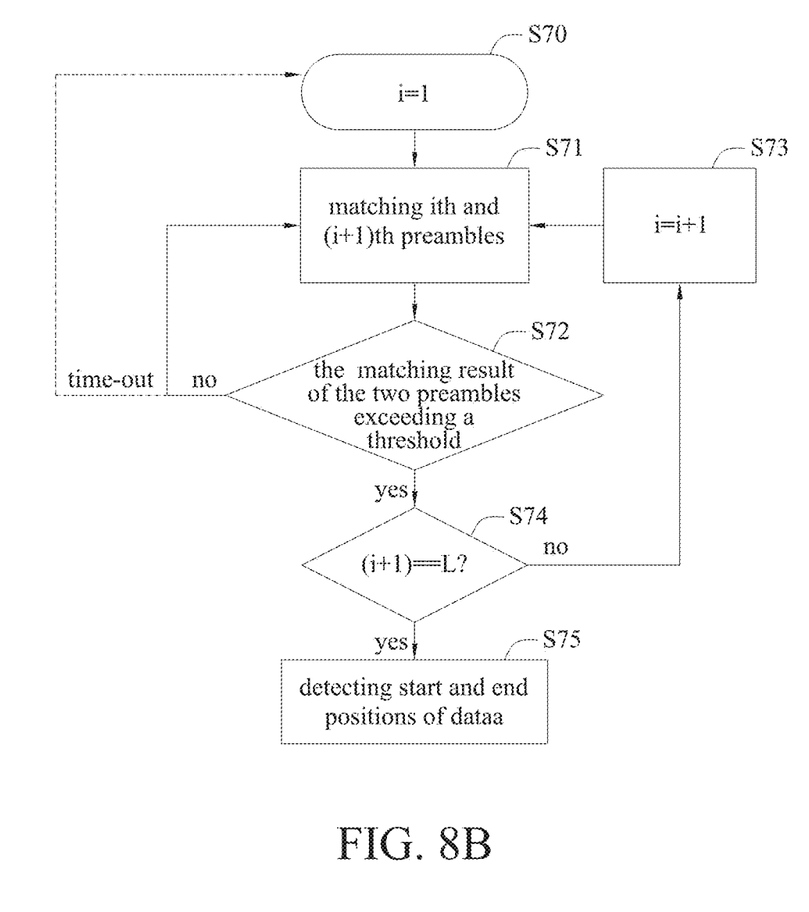
FIG. 8B is a flow chart illustrating the detection of the augmentation method according to the third embodiment of the present disclosure.

In order to be applicable to various communication-related applications and to support communication standards with higher data rates in the future, the sampling rate of the software-defined radio system disclosed herein can be set by users and the system will support a very high sampling rate. In the case of high sampling rate, the receiving end must perform high downsample rate matching. When the length of the preamble is fixed, the higher the downsample rate to be supported, and the shorter the length of the sequence will be configured on the frequency. As a result, the number of groups that can support the maximum simultaneous operation is reduced. The lower the ratio of the sequence to the total bandwidth is, the more the matching noise at the receiving end increases. Even if the length of the preamble is increased, the above problems cannot be solved. Therefore, as shown in FIG. 7, the present disclosure also provides a method for augmenting the maximum amount of support for simultaneously operating groups. The method may also use the designs of the first and second embodiments of the present disclosure. FIGS. 8A and 8B respectively show a block diagram and a detection flow diagram of the method for augmenting the maximum amount of support for simultaneously operating groups. The method includes: if the length of the symbol of the original preamble is N, the number of sequence points placed on the frequency is M, corresponding to generating M different sequences, and supporting up to M groups to operate simultaneously. If the maximum number of groups that can be supported is desired, L symbols of N points that have the same structure can be concatenated to form a preamble/postamble. The sequences on these L symbols can be the same or different. However, all of them are all selected from the original M different sequences, so that up to $M^L$ groups can be supported to operate simultaneously. First, a parameter i is set to 1 (step S70), that is, the matching is performed from the first symbol, so the receiving end first matches the first symbol first. When the matching is successfully, the receiving end continues to match the second symbol (step S71). After the matching is successfully, it is determined whether the time difference between the peaks of the second symbol and the first symbol is correct (step S72). If correct, the next symbol is continuously matched (step S73) until all the L symbols are detected successfully, indicating that the preamble or the postamble is detected successfully (step S74). Finally, the start and end positions of the detected data can be obtained (step S75).

Such augmentation method has the advantages as follows. Each symbol in the preamble/postamble is selected from the same sequence set. No additional sequences need to be defined, and the memory requirement on the hardware is not increased. Moreover, as long as one additional symbol is connected to the symbols in series, the maximum amount of support for simultaneously operating groups can be rapidly expanded.

The augmentation method of the present disclosure is applied to an actual situation as an example. If the design scenario of the first embodiment is used, the preamble has a length of 256 symbols, and the Zadoff-Chu sequence of the length of 64 is used in the frequency domain, at this time, matching with the downsample rate up to 4 can be supported and up to 64 groups can be supported to operate simultaneously. If it is desired to further expand to be able to simultaneously 1,000 groups to operate at the same time, the above two preambles are serially connected by the group support amount augmentation method (the third embodiment) of the present disclosure, the Zadoff-Chu sequences of the two preambles can be the same or different. Accordingly, up to $64^2$=4096 groups can be supported to operate simultaneously. The number of groups that can operate at the same time is greatly expanded without changing the original preamble and without additionally defining other sequences. In the receiving end, according to the detecting flow chart of FIG. 8B, the receiving end will match the second preamble every time when receiving a sampling point, and match the first preamble to the received sampling after the delay of 256 points. When both matching detection are successful, it is determined as the start and end positions of the user signal.

Figure 9A:
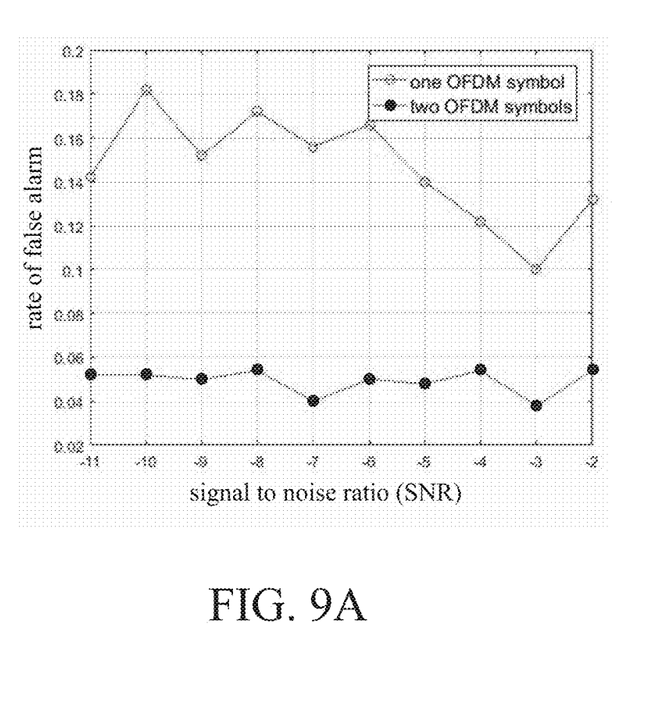
FIGS. 9A and 9B are comparison test results of the rate of a fault alarm using and without the augmentation method according to the present disclosure.
Figure 9B:
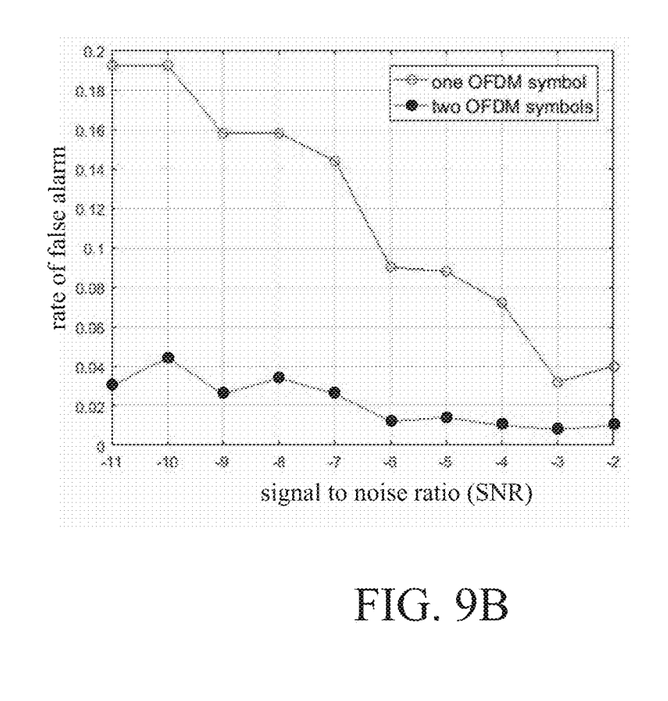

If it is desired to use the software-defined radio is used in a very low SNR environment, the threshold used for matching decisions will be relatively low, resulting in the occurrence of a false alarm. In order to reduce the probability of the occurrence of the fault alarm as much as possible, two types of fault alarms are tested according to the present disclosure: (1) the packets of the same group are detects, and the detection is successful but the start position of the signal of the user is false; and (2) the packets of other groups are detected, and the detection is successful but the packets are misrecognized as the signal of the user of the group. The rates of the two false alarms are shown in FIGS. 9A and 9B. If the group support amount augmentation method disclosed in the present disclosure is not used, only one symbol of 256 points is used as the preamble. If the group support amount augmentation method disclosed in the present disclosure is used, the two segments of 256 points are serially connected as the preamble. The design of the first embodiment is used in both cases. As can be seen from FIGS. 9A and 9B, the group support amount augmentation method of the present disclosure can greatly reduce the rate of the false alarm.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A software-defined radio system for packet detection, comprising:
   a transmitting end configured for assigning a preamble and a postamble to a start position and an end position of a packet of a signal, respectively, before transmitting the signal; and
   a receiving end configured for detecting a channel, wherein the receiving end stores the signal in memory when the preamble is detected, and stops storing the signal in the memory and transmits the signal to a computing device when the postamble is detected,
   wherein the preamble and the postamble have a fixed number of points, and are not related to a transmission baud-rate or a sampling rate defined by the software-defined radio system, and
   wherein a maximal bandwidth allocated with the preamble and the postamble is defined as Bmax, a bandwidth that is actually occupied by the preamble and the postamble is defined as B, r=B/Bmax, and r is not related to the transmission baud-rate or the sampling rate defined by the software-defined radio system.

2. The software-defined radio system of claim 1, wherein a maximal bandwidth allocated with the preamble and the postamble is defined as Bmax, a bandwidth that is actually occupied by the preamble and the postamble is defined as B, r=B/Bmax, and r decreases as the transmission baud-rate or the sampling rate defined by the software-defined radio system increases.

3. A packet detection method for a software-defined radio system, the method comprising:
   assigning a preamble and a postamble to a start position and an end position of a packet of a signal, respectively, before transmitting the signal by a transmitting end;
   detecting a channel by a receiving end;
   storing the signal in memory by the receiving end when the preamble is detected; and
   stopping storing the signal in the memory and transmitting the signal to a computing device by the receiving end when the postamble is detected,
   wherein the preamble and the postamble have a fixed number of points, and are not related to a transmission baud-rate or a sampling rate defined by the software-defined radio system, and
   wherein a maximal bandwidth allocated with the preamble and the postamble is defined as Bmax, a bandwidth that is actually occupied by the preamble and the postamble is defined as B, r=B/Bmax, and r is not related to the transmission baud-rate or the sampling rate defined by the software-defined radio system.

4. The method of claim 3, wherein a maximal bandwidth allocated with the preamble and the postamble is defined as Bmax, a bandwidth that is actually occupied by the preamble and the postamble is defined as B, r=B/Bmax, and r decreases as the transmission baud-rate or the sampling rate defined by the software-defined radio system increases.

5. A software-defined radio system for packet detection, comprising:
   a transmitting end configured for assigning a preamble and a postamble to a start position and an end position of a packet of a signal, respectively, before transmitting the signal; and
   a receiving end configured for detecting a channel, wherein the receiving end stores the signal in memory when the preamble is detected, and stops storing the signal in the memory and transmits the signal to a computing device when the postamble is detected,
   wherein a sequence on the preamble and the postamble is selected by using a group ID, and
   wherein in the transmitting end, the preamble and the postamble are composed of a plurality of symbols having a length of N points connected in series; a plurality of sequences on the plurality of symbols are the same or different, and are selected by using group IDs; in the receiving end, the receiving end first detects a first symbol in the plurality of symbols having the length of N points; when detecting successfully, the receiving end continues to detect a second symbol in the plurality of the symbols; when detecting successfully, it is determined whether a time difference between the second symbol and the first symbol is correct; and if correct, the next symbol in the plurality symbols is continuously detected until all the plurality of symbols are detected successfully, indicating that the preamble or the postamble is detected successfully.

6. A packet detection method for a software-defined radio system, the method comprising:
   assigning a preamble and a postamble to a start position and an end position of a packet of a signal, respectively, before transmitting the signal by a transmitting end;
   detecting a channel by a receiving end;
   storing the signal in memory by the receiving end when the preamble is detected; and
   stopping storing the signal in the memory and transmitting the signal to a computing device by the receiving end when the postamble is detected,
   wherein a sequence on the preamble and the postamble is selected by using a group ID, and
   wherein in the transmitting end, the preamble and the postamble are composed of a plurality of symbols having a length of N points connected in series; a plurality of sequences on the plurality of symbols are the same or different, and are selected by using group IDs; in the receiving end, the receiving end first detects a first symbol in the plurality of symbols having the length of N points; when detecting successfully, the receiving end continues to detect a second symbol in the plurality of symbols; when detecting successfully, it is determined whether a time difference between the second symbol and the first symbol is correct; and if correct, the next symbol in the plurality of symbols is continuously detected until all the plurality of symbols are detected successfully, indicating that the preamble or the postamble is detected successfully.

* * * * *